Nov. 4, 1958 W. M. ARNEBERG 2,858,611
PICNIC FORK
Filed Sept. 7, 1956

INVENTOR.
Walter M. Arneberg
BY
Merchant + Merchant
ATTORNEYS

United States Patent Office 2,858,611
Patented Nov. 4, 1958

2,858,611
PICNIC FORK

Walter M. Arneberg, Minneapolis, Minn.

Application September 7, 1956, Serial No. 608,577

1 Claim. (Cl. 30—322)

My invention relates generally to cooking utensils and more specifically to utensils of the type generally used in outdoor cooking.

Still more specifically, my invention relates to tine or skewer-equipped devices upon which frankfurters, wieners, or other food objects are adapted to be impaled for roasting over an open fire.

The primary object of my invention is the provision of a device of the class above described which includes a pair of laterally spaced tines which are connected together at their rear ends, and which is provided with an integrally formed elongated ferrule forming member which projects rearwardly in the plane of the tines and is disposed intermediate of imaginary rearward extensions of each tine, and which ferrule forming member is provided with opposed pairs of spaced wings which project from opposite sides thereof and which may be readily wrapped about or alternatively removed from a stick or other stem.

A further object of my invention is the provision of a device of the class immediately above described which may be pressed from a single sheet of metal and which when detached from a shaft is sufficiently small as to enable the same to be stored in a relatively small picnic basket or other container.

A still further object of my invention is the provision of a device of the class described which is extremely inexpensive to produce and which is rugged and durable in construction.

The above and still further objects of my invention will become apparent from the following detailed specification, appended claims, and attached drawings.

Referring to the drawings, wherein like characters indicate like parts throughout the several views.

Figure 1:
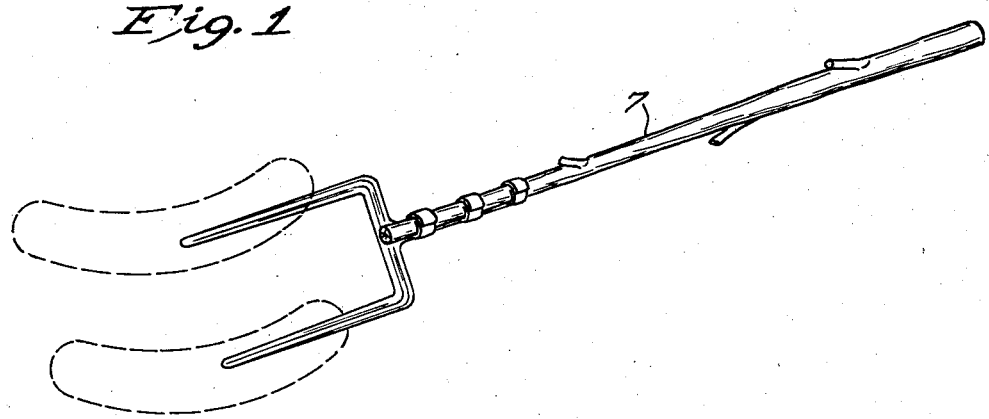
Fig. 1 is a perspective view showing my novel device attached to a stick or other stem piece.
Figure 2:
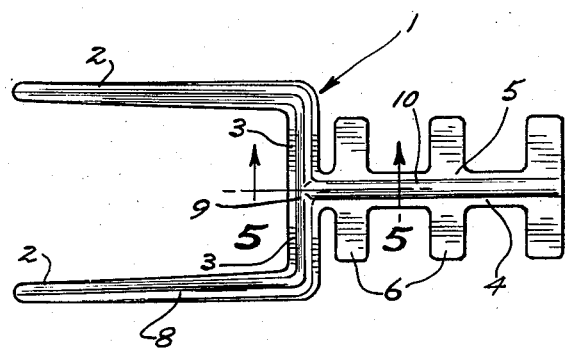
Fig. 2 is a view in top plan of my novel device.
Figure 3:
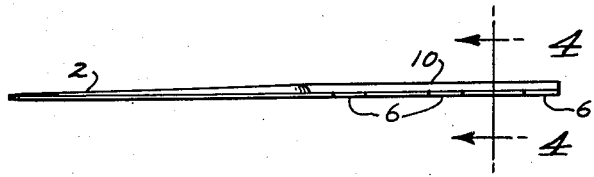
Fig. 3 is a view in side elevation of the structure of Fig. 2.
Figure 4:
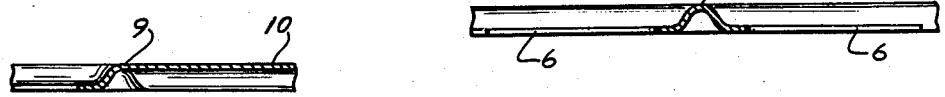
Fig. 4 is a fragmentary view partly in section and partly in rear elevation as seen from the line 4—4 of Fig. 3.
Figure 5:
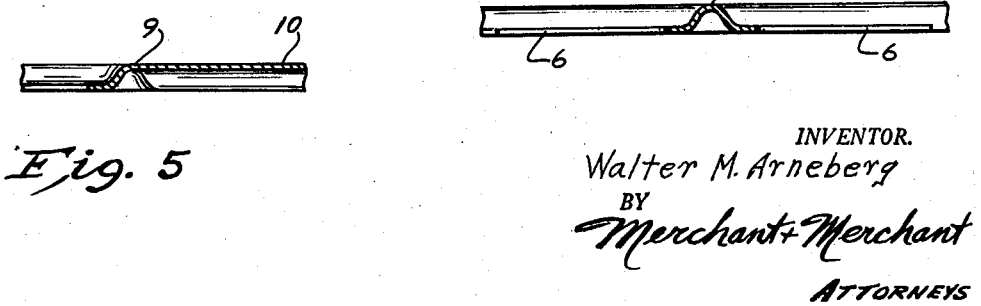
Fig. 5 is an enlarged fragmentary view as seen substantially on the line 5—5 of Fig. 2.

Referring with greater particularity to the drawings, the numeral 1 indicates in its entirety a cooking utensil head pressed from a single unitary sheet of suitable sheet metal, such as steel or aluminum. The head 1 is formed to provide a pair of longitudinally extending, laterally spaced generally parallel tine or skewer portions 2 which have their rear ends joined by a laterally extending connector portion 3. Extending longitudinally rearwardly from the connector portion 3 in the plane of the tines 2, and in longitudinally spaced relation to the tines 2, is a ferrule forming portion 4. The ferrule forming portion 4 includes a longitudinally extending elongated shank portion 5 disposed intermediate of imaginary longitudinally rearward extensions of each tine 2 and generally parallel thereto and a plurality of opposed pairs of longitudinally spaced wings 6 projecting laterally from opposite sides of the shank portion 5.

The sheet metal from which the head 1 is formed, and the transverse width of the wings 6 is such as to enable the wings 6 to be manually bent around the forward end of a stick, or other stem piece 7, as indicated in Fig. 1.

For the purpose of imparting rigidity to the head 1, I form tine-forming portions 2, connector portion 3, and shank portion 5 with connecting cross sectionally U-shaped rib sections 8, 9, and 10 respectively. It will be noted that the rib sections 8, 9, and 10 respectively extend substantially the length of each of said portions 2, 3, and 5, midway between the edge portions of each thereof. Also, it is important to note that the rib sections 8 and 9 of the tines 2 and connector portion 3, respectively, are joined to define a continuous rib with the rib section 10 in the shank portion 5 joining and terminating at the approximate center of the rib section 9 in the connector portion 3. This arrangement assures adequate strength of the connector portion 3 longitudinally of the rib section 9.

My invention has been thoroughly tested and found to be completely satisfactory for the accomplishment of the above objects, and while I have disclosed a preferred embodiment thereof, I wish it to be specifically understood that same is capable of modification without departure from the scope and spirit of the invention as defined in the appended claim.

I claim:

A fork formed of a unitary sheet of metallic material, said fork having a laterally extending connector portion, a pair of laterally spaced tines extending longitudinally forwardly from the connector portion and disposed in generally parallel relation to each other, a ferrule forming portion extending longitudinally rearwardly from said connector portion and disposed in longitudinally spaced relation to the tines, said ferrule forming portion including a longitudinally extending elongated shank portion disposed intermediate of longitudinally rearward extensions of each tine and generally parallel thereto, a plurality of longitudinally spaced pairs of opposed wings projecting laterally from opposite sides of the shank portion, a reinforcing rib section of generally U-shape in cross section extending substantially the full length of said tines, connector portion and shank portion intermediate their respective edge portions, and said rib sections of the tines and connector portion being joined to define a continuous rib with the rib section of the shank portion joining and terminating at the approximate center of the rib section of the connector portion.

References Cited in the file of this patent

UNITED STATES PATENTS

| | | |
|---|---|---|
| 243,889 | Hart | July 5, 1881 |
| 997,368 | Burch | July 11, 1911 |
| 1,936,264 | Ready | Nov. 21, 1933 |
| 2,046,334 | Loeber | July 7, 1936 |